United States Patent
Hintzen et al.

(10) Patent No.: US 10,836,230 B2
(45) Date of Patent: Nov. 17, 2020

(54) SUSPENSION WITH NON-ROTATING SHOCK ABSORBER

(71) Applicant: FORD GLOBAL TECHNOLOGIES, LLC, Dearborn, MI (US)

(72) Inventors: Ralf Hintzen, Aachen (DE); Thomas Gerhards, Niederzier (DE)

(73) Assignee: Ford Global Technologies, LLC, Dearborn, MI (US)

(*) Notice: Subject to any disclaimer, the term of this patent is extended or adjusted under 35 U.S.C. 154(b) by 68 days.

(21) Appl. No.: 16/164,093

(22) Filed: Oct. 18, 2018

(65) Prior Publication Data
US 2019/0135067 A1    May 9, 2019

(30) Foreign Application Priority Data
Oct. 19, 2017  (DE) .................. 10 2017 218 719

(51) Int. Cl.
*B60G 15/06*    (2006.01)
*B60G 13/00*    (2006.01)
(Continued)

(52) U.S. Cl.
CPC ............ *B60G 15/068* (2013.01); *B60G 3/06* (2013.01); *B60G 7/02* (2013.01); *B60G 13/005* (2013.01);
(Continued)

(58) Field of Classification Search
CPC .......... B60G 15/068; B60G 3/06; B60G 7/02; B60G 13/005; B60G 2200/17;
(Continued)

(56) References Cited

U.S. PATENT DOCUMENTS

| 2,227,821 A * | 1/1941 | Burrell | B62D 1/192 74/493 |
| 3,603,574 A * | 9/1971 | Lutz | B60G 15/07 267/34 |

(Continued)

FOREIGN PATENT DOCUMENTS

| DE | 102012221678 A1 | 5/2014 |
| DE | 102014226225 A1 | 6/2016 |

(Continued)

OTHER PUBLICATIONS

Johansson Anders. Development of a Hi-Per strut from suspension. Department of Applied Mechanics. Chalmers University of Technology Göteburg, Sweden 2011. 47 pages.

*Primary Examiner* — Darlene P Condra
(74) *Attorney, Agent, or Firm* — Raymond L. Coppiellie; Brooks Kushman P.C.

(57) ABSTRACT

A RevoKnuckle-type suspension for a wheeled vehicle has a hub mounted to a bearing carrier for rotation relative thereto about a steering axis, and a shock absorber connected non-rotatably to the bearing carrier. The shock absorber has an outer cylinder having an axially-extending guide hole defined therein, and a piston and attached piston rod retained for axial reciprocation in the guide hole. The guide hole and at least one of the piston and the piston rod retained therein have respective complementary-shaped, non-circular cross-sectional shapes which engage one another to resist axial rotation of the piston and/or the piston rod within the guide hole. The carrier is therefore restrained against rotation relative to the vehicle sprung structure without the need for any additional component(s) such as a control arm or stabilizer, as required in a traditional RevoKnuckle-type suspension.

3 Claims, 6 Drawing Sheets

(51) Int. Cl.
  *B60G 7/02* (2006.01)
  *F16F 9/32* (2006.01)
  *B60G 3/06* (2006.01)

(52) U.S. Cl.
  CPC ........ *F16F 9/3221* (2013.01); *B60G 2200/10* (2013.01); *B60G 2200/142* (2013.01); *B60G 2200/17* (2013.01); *B60G 2200/422* (2013.01); *B60G 2200/44* (2013.01); *B60G 2204/129* (2013.01); *B60G 2204/1484* (2013.01); *B60G 2204/4232* (2013.01); *B60G 2206/41* (2013.01); *B60G 2206/50* (2013.01)

(58) Field of Classification Search
  CPC ........ B60G 2200/422; B60G 2204/129; B60G 2204/4232; B60G 2200/142; B60G 2200/44; B60G 2206/41; B60G 2204/1484; B60G 2200/10; B60G 2206/50; B60G 15/07; B60G 3/18; F16F 9/3221
  See application file for complete search history.

(56) References Cited

U.S. PATENT DOCUMENTS

| | | | | |
|---|---|---|---|---|
| 6,149,176 | A * | 11/2000 | Fujii | B62K 25/30 |
| | | | | 192/209 |
| 6,543,791 | B1 * | 4/2003 | Lee | A63C 17/06 |
| | | | | 152/47 |
| 8,668,164 | B2 * | 3/2014 | Seror Goguet | B64C 7/00 |
| | | | | 244/1 N |
| 9,169,890 | B2 * | 10/2015 | Groves | F16F 9/3484 |
| 2015/0203195 | A1 * | 7/2015 | Vatovec | B64C 25/58 |
| | | | | 244/103 R |
| 2016/0230835 | A1 * | 8/2016 | Groves | F16F 9/48 |
| 2016/0297269 | A1 | 10/2016 | Simon et al. | |
| 2017/0240835 | A1 * | 8/2017 | Yang | C10M 107/38 |
| 2018/0170140 | A1 * | 6/2018 | Lee | B60G 13/005 |

FOREIGN PATENT DOCUMENTS

| | | |
|---|---|---|
| WO | 2015144482 A1 | 10/2015 |
| WO | 2016078842 A1 | 5/2016 |

* cited by examiner

SUSPENSION WITH NON-ROTATING SHOCK ABSORBER

CROSS-REFERENCE TO RELATED APPLICATIONS

This application claims foreign priority benefits under 35 U.S.C. § 119(a)-(d) to DE Application 10 2017 218 719.0 filed Oct. 19, 2017, which is hereby incorporated by reference in its entirety.

TECHNICAL FIELD

The invention relates to a suspension for a vehicle exhibiting a hub bearing on which a vehicle wheel can mounted rotatably, a carrier on which the hub bearing is mounted rotatably about a substantially vertical steering rotational axis, a shock absorber which has a cylinder connected non-rotatably to the carrier, a piston arranged displaceably in the cylinder and a piston rod connected to the piston, and at least one top-mount bearing via which the piston rod can be connected to the vehicle body. Furthermore, the invention relates to a vehicle.

BACKGROUND

On a vehicle a steerable vehicle wheel is connected to a vehicle body via a suspension. The suspension may be configured following the so-called RevoKnuckle design. According to the RevoKnuckle design, a hub bearing of the suspension on which a vehicle wheel is rotatably mounted is mounted rotatably on a carrier of the suspension about a substantially vertical steering rotational axis, to which carrier a cylinder of a shock absorber of the suspension is connected non-rotatably. Unlike in the case of a conventional MacPherson strut suspension, the shock absorber need therefore no longer be rotatably attached to the vehicle body, as during steering movements the hub bearing is rotated about the steering rotational axis, while the carrier and the shock absorber are fixed.

The advantage of a RevoKnuckle suspension compared with a conventional MacPherson suspension is that an expanding axis of the suspension is arranged close to the center of the wheel and the suspension therefore has a small kingpin offset. This means that the steering wheel moments can be reduced, which has a positive effect on driving comfort. However, in the case of a RevoKnuckle suspension, a rotation of the suspension carrier about the longitudinal center axis of the wheel suspension shock absorber is prevented so that high steering accuracy, good steering response and good steering stability can be guaranteed. For this purpose, the carrier may be traditionally connected to a front-side stabilizer of the suspension or to an additional control arm, wherein the additional control arm may connect the carrier to an auxiliary frame of the suspension.

The connection of the carrier of a RevoKnuckle suspension to a stabilizer is relatively difficult to achieve, since the function and/or efficiency of the stabilizer is/are negatively affected, for example by a modified guide or design of the stabilizer. As a result of this, the rolling behavior of the vehicle can be made worse, for example. This leads to poorer vehicle handling and, at the same time, to an increase in weight. The alternative use of an additional control arm also leads to an increase in cost and weight.

US 2016/0297269 A1 discloses a RevoKnuckle suspension for a vehicle, exhibiting a top-mount bearing on which a wheel is rotatably mounted and a carrier on which the top-mount bearing is rotatably mounted about a substantially vertical steering rotational axis, wherein the vertical steering rotational axis runs close to the center of the wheel. Furthermore, the suspension has a spring shock absorber strut which is connected at one end to the carrier and at the other end is supported on a vehicle body, a lateral link which is connected at one end to the carrier in a first articulation and at the other end is articulated in a pivotally movable manner on the vehicle body, and an additional control arm which is connected at one end to the carrier in a second articulation and at the other end to the lateral link in a third articulation. The additional control arm is arranged relative to the lateral link in such a manner that a force exertion line of the additional control arm is inclined in a front view of the additional control arm and the lateral link is inclined in such a manner towards a lateral link axis defined by the articulation point of the lateral link on the body side and the articulation point of the lateral link on the carrier side, that the intersection point of the force exertion line and the lateral link axis lies in at least one predefined construction position between the articulation point of the lateral link on the body side and the articulation point of the lateral link on the carrier side, wherein the construction position is defined by a static state in the absence of dynamic rebound and deflection movements.

WO 2015/144482 A1 relates to a steering device for a motor vehicle for pivoting at least one steerable vehicle wheel arranged on a suspension in a sprung manner in relation to a chassis of the motor vehicle, wherein the steerable vehicle wheel is rotatably mounted on a steering knuckle and the steering knuckle is mounted on the suspension in at least one pivot bearing in such a manner that said steering knuckle can be pivoted about a pivot axis. The steering device has at least one servomotor which has a rotatable output shaft. The servomotor is rigidly arranged on the chassis, wherein an articulated shaft is provided which is connected non-rotatably at one end to the output shaft of the servomotor and bears a set of teeth at the other end which engages with a set of mating teeth connected non-rotatably to the steering knuckle, in such a way that a rotation of the output shaft of the servomotor causes a rotation of the steerable vehicle wheel about the pivot axis.

WO 2016/078842 A1 relates to an axle for wheels of a double-tracked motor vehicle, wherein on each side of the vehicle the axle has a wheel support, a shock absorber strut, a transverse link, and a transverse leaf spring which guides the wheel at least partially laterally and/or in the longitudinal direction of the vehicle. The shock absorber strut has a shock absorber tube and a shock absorber piston which can be moved in the shock absorber tube along a shock absorber longitudinal axis, wherein the shock absorber strut is attached with the shock absorber tube to the wheel support and is supported on the wheel support at a first effective kinematic point. The transverse link has an end region on the wheel support side and is attached with the end region on the wheel support side to the wheel support and is supported on the wheel support at a second effective kinematic point. The transverse leaf spring extends, relative to a functional installation state of the axle in a double-tracked motor vehicle, in a substantially transverse direction to the vehicle and has at least one end region of the wheel support side. The transverse leaf spring is attached with its end region on the wheel support side to the shock absorber strut and is supported on the shock absorber strut at a third effective kinematic point.

DE 10 2012 221 678 A1 relates to a shock absorber strut axle with a wheel carrier fastened to a wheel-guiding transverse leaf spring for a motor vehicle. The transverse leaf spring produces a bending moment in the construction position which opposes a bending moment produced by a wheel contact force.

DE 10 2014 226 225 A1 relates to a suspension assembly of an axle assembly for a vehicle, comprising a shock absorber strut and a camber bearing. Furthermore, the suspension assembly comprises an axle offset element which is arranged between the shock absorber strut and the camber bearing in such a manner that between an axis of rotation of the camber bearing and a longitudinal axis of the shock absorber strut, an axial offset occurs. The shock absorber strut is connected to the axial offset element at a side of the axial offset element facing a wheel center of a wheel of the axial assembly. The camber bearing is connected to the axle offset element at a side of the axial offset element facing away from a wheel center of a wheel of der axial assembly.

The publication entitled "The RevoKnuckle" (available to download at http://www.autoline.ty/journal-wp-content/uploads/2009/02/revo-knuckle.pdf) and the publication entitled "Development of a Hi-Per strut front suspension" (available to download at http://publications.lib.chalmers.de/records/fulltext/149741.pdf) each disclose a RevoKnuckle suspension wherein the carrier supporting the hub bearing is connected to a stabilizer of the suspension for twisting protection.

SUMMARY

The disclosed apparatus provides a lightweight suspension for a vehicle that can be produced cost-effectively.

In the disclosed suspension, the cylinder and the piston and/or the piston rod of a shock absorber are connected in a manner which prevents the cylinder from twisting about its longitudinal center axis relative to the piston or the piston rod, and in which the top-mount bearing is configured such that the piston rod can be connected to the vehicle body via the top-mount bearing in a non-rotational manner.

It should be pointed out that the features and measures listed individually in the following description can be combined with one another in any technically feasible manner and disclose further embodiments of the invention. In addition, the description characterizes and specifies the invention in particular in connection with the figures.

The disclosed suspension is generally configured as a RevoKnuckle suspension. However, in order to prevent the carrier of the suspension (which is connected in a non-rotational manner to the shock absorber cylinder) from twisting about the longitudinal center axis of the shock absorber, the carrier is not, as typical of previous RevoKnuckle designs, connected to a stabilizer or an additional control arm of the suspension. Instead, the anti-twist protection for the carrier is created, firstly, by the arrangement of at least one anti-twist protection between the cylinder connected in a non-rotational manner to the carrier and the piston and/or the piston rod and, secondly, by the embodiment of the upper top-mount bearing which is configured such that it creates a non-rotational connection between the piston rod and the vehicle body. Through the non-rotational connection of the carrier to the cylinder, the anti-twist protection between the cylinder, on the one hand, and the piston and/or the piston rod, on the other, and also the non-rotational connection of the piston rod via the top-mount bearing to the vehicle body, the carrier is consequently indirectly supported on the vehicle body in respect of rotational forces acting on it about the longitudinal center axis of the shock absorber and thereby protected from corresponding twisting.

In the case of the disclosed suspension, no other components, such as additional control arms or similar, for example, are required in order to prevent the carrier from twisting about the longitudinal center axis of the shock absorber. In this way, the disclosed suspension can be produced more cost-effectively and have a more lightweight design than a traditional RevoKnuckle suspension.

Since the anti-twist protection of the carrier does not require a connection of the carrier to a suspension stabilizer either, the stabilizer may be optimally designed without limitation for its desired stabilization function, without consideration thereby having to be given, as is traditional, to an attachment of the stabilizer to the carrier. The properties of the suspension are thereby improved.

The disclosed suspension, in particular the shock absorber and top-mount bearing thereof, requires no additional components to reduce steering friction which are necessary in traditional suspensions. For example, no upper radial and/or axial bearing need be present, in order to be able to connect the piston rod to the vehicle body rotatably about its longitudinal axis. In contrast with a bearing of this kind, the top-mount bearing according to the invention, via which the piston rod can be connected non-rotatably to the vehicle body, may have a substantially simpler and therefore more cost-effective design.

The top-mount bearing according to the invention may, for example, be made of an elastic material such as rubber, for example, an elastomer, a plastic or similar, for example as a single support and/or insulating element. Overall, the design of the disclosed suspension may therefore be simplified by comparison with traditional suspensions, as a result of which the disclosed suspension can be produced more cost-effectively.

The anti-twist protection may be arranged between the cylinder and the piston, or between the cylinder and the piston rod, or between the cylinder and both the piston and the piston rod. The anti-twist protection may be created by a special embodiment of the cylinder, on the one hand, and of the piston or the piston rod, on the other. Alternatively, the anti-twist protection can be realized by at least one additional component on the cylinder, the piston or the piston rod.

The fact that the piston rod can be connected to the vehicle body via the top-mount bearing in a non-rotational manner means that the piston rod can be connected to the vehicle body in a non-rotational manner in respect of the longitudinal center axis. The fact that the cylinder of the shock absorber is connected to the carrier in a non-rotational manner means that the cylinder is connected to the carrier in a non-rotational manner in respect of the longitudinal center axis of the shock absorber.

The suspension may, in addition, have at least one spring element, for example a coil spring or a helical spring, via which the carrier is cushioned in relation to the vehicle body. For this purpose, the spring element may, on the one hand, be supported on the top-mount bearing and, on the other hand, on an abutment on the cylinder or the carrier. The shock absorber is used, in particular, as a vibration damper.

According to an advantageous embodiment, an axial guide hole defined within the cylinder, in which the piston and/or the piston rod is displaceably axially guided, has a cross-sectional area that is non-circular, wherein the piston and/or the piston rod has a correspondingly shaped cross-sectional area. As a result of this, the anti-twist protection is configured between the cylinder, on the one hand, and the piston or the piston rod, on the other. The shape of the cross-sectional area of the guide hole may, for example, be polygonal, oval, or primarily circular and having at least one flattened chord surface or facet.

A further advantageous embodiment envisages that the piston and/or the piston rod has at least one guide grove extending axially along an outer surface thereof, and the guide hole in which the piston and/or piston rod is retained has at least one guide element pointing radially inwards and engaging the guide groove(s). The anti-twist protection is thereby formed between the cylinder and the piston and/or piston rod retained therein.

According to a further advantageous embodiment, at least one guide groove runs along an inner surface of the guide hole, and at least one radially outwardly-pointing guide element runs along an outside of the piston or piston rod and engages with the guide groove. The anti-twist protection is thereby formed between the cylinder, on the one hand, and the piston or the piston rod, on the other.

The above problem is furthermore solved by a vehicle having the features of the aforementioned embodiments or a combination of at least two of these embodiments with one another.

The advantages referred to above in relation to the suspension are associated with the vehicle accordingly. The vehicle is a road vehicle and may, for example, be configured as a motor vehicle such as an automobile or a truck, for example.

Further advantageous embodiments of the invention are disclosed in the dependent claims and the following figure description. In the figures:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the different figures, identical parts are always provided with the same reference numbers, which is why they are also usually described only once.

Figure 1:
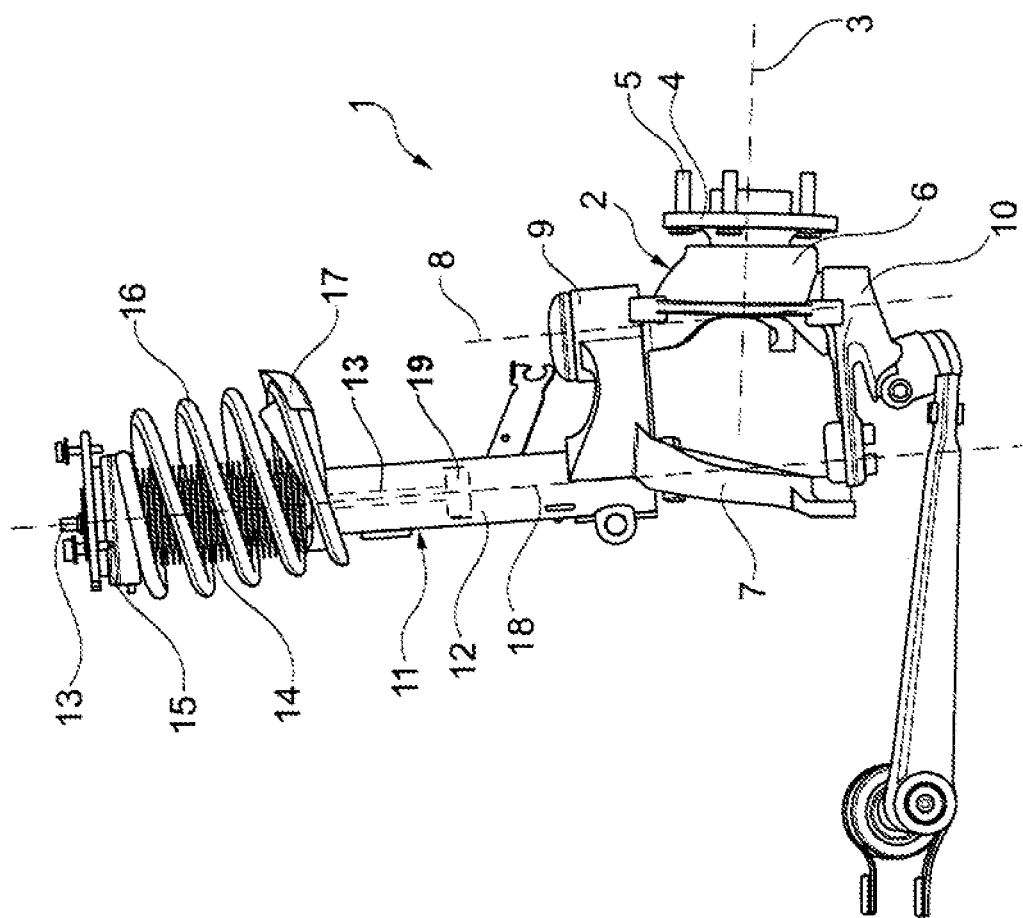
FIG. 1 shows a schematic representation of an exemplary embodiment for a disclosed suspension.

FIG. 1 shows a schematic representation of an exemplary embodiment for a suspension 1 according to the invention for a vehicle which is not shown.

The suspension 1 has a hub bearing 2 on which a vehicle wheel, which is not shown, is rotatably mountable about a substantially horizontal rotational axis 3. The hub bearing 2 has a hub flange 4 with wheel screws 5 mounted thereon, onto which wheel nuts which are not shown can be screwed, in order to connect the vehicle wheel to the hub flange 4 in a non-rotational manner. The hub flange 4 is mounted rotatably about the rotational axis 3 on a supporting component 6 of the hub bearing 2.

Furthermore, the suspension 1 has a carrier 7 on which the hub bearing 2 is rotatably mounted about a substantially vertical steering rotational axis 8. For this purpose, the hub bearing 2 is movably connected via an upper articulation 9 and a lower articulation 10 to the carrier 7.

In addition, the suspension 1 has a shock absorber 11 which has a cylinder 12 connected non-rotatably to the carrier 7, a piston 19 retained within in the cylinder 12 for reciprocating axial movement relative thereto, and a piston rod 13 attached to the piston. An axially elastically deformable protective element 14 is arranged on the cylinder 12 to protects the shock absorber 11 from contamination.

The suspension 1 has a top-mount bearing 15 to which an upper end of the piston rod 13 is attached and via which the piston rod 13 can be connected to unsprung structure of the vehicle (not shown). The protective element 14 leads to the top-mount bearing 15.

In addition, the suspension 1 has a spring element 16 in the form of a coil or helical spring which, on the one hand, is supported on the top-mount bearing 15 and, on the other hand, on a spring seat 17 arranged on the cylinder 12.

Between the cylinder 12, on the one hand, and the piston 19 and/or the piston rod 13, on the other, is arranged at least one anti-twist protection with which the cylinder 12 is protected against twisting about its longitudinal center axis 18 relative to the piston 19 or the piston rod 13. In addition, the top-mount bearing 15 is configured in such a manner that the piston rod 13 can be connected to the vehicle body via the top-mount bearing 15.

In order to create the anti-twist protection, an axially-extending guide hole 22 defined by and within the cylinder 12 and in which the piston 19 and/or the piston rod 13 is guided for axial movement relative thereto (during functioning of the shock absorber 11 to dampen jounce and rebound of the bearing carrier 7 and attached components) has a non-circular cross-sectional area, and the piston 19 and/or the piston rod 13 has a correspondingly shaped non-circular cross-sectional area.

Figure 2:
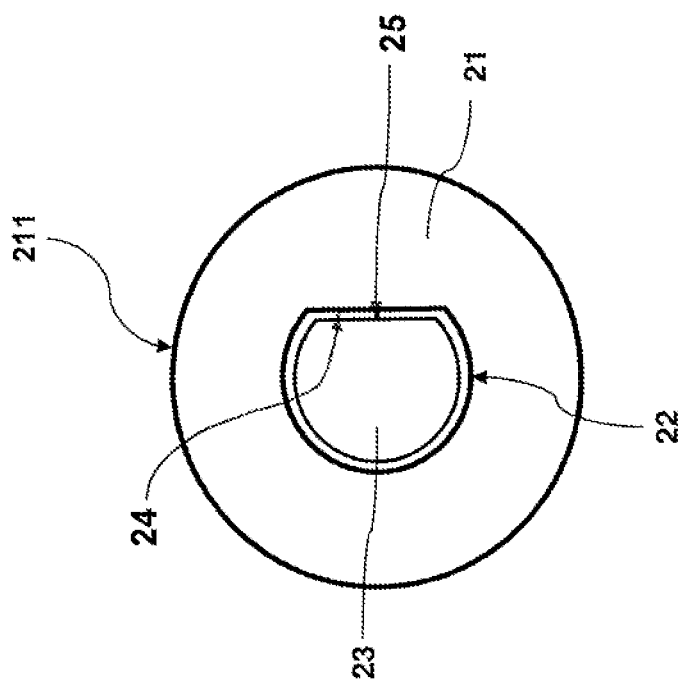
FIG. 2 shows a schematic cross-sectional representation of a shock absorber of a further exemplary embodiment of a suspension.

FIG. 2 shows a schematic cross-sectional representation of a shock absorber 211 of an exemplary embodiment for a suspension according to the invention, wherein a guide hole 22 is defined by the inner guide surface of the cylinder 21 and the piston rod 23 is retained in the guide hole for axially-guided movement relative thereto. The guide hole 22 has a cross-sectional area or shape which is non-circular, and the outer surface of the piston rod 23 has a complementary shaped cross-sectional area or shape. In the depicted embodiment, the cross-sectional area of the guide hole 22 deviates from being entirely circular by having a facet 24 formed as a flattened surface or chord. The cross-sectional shape of the piston rod 23 is likewise configured as primarily (but not entirely) circular, deviating from circular by having a facet 25 formed as a flattened surface or chord which corresponds to the interior surface of the guide hole 22.

Otherwise, the suspension 20 may be configured in accordance with the exemplary embodiment shown in FIG. 1.

Figure 3:
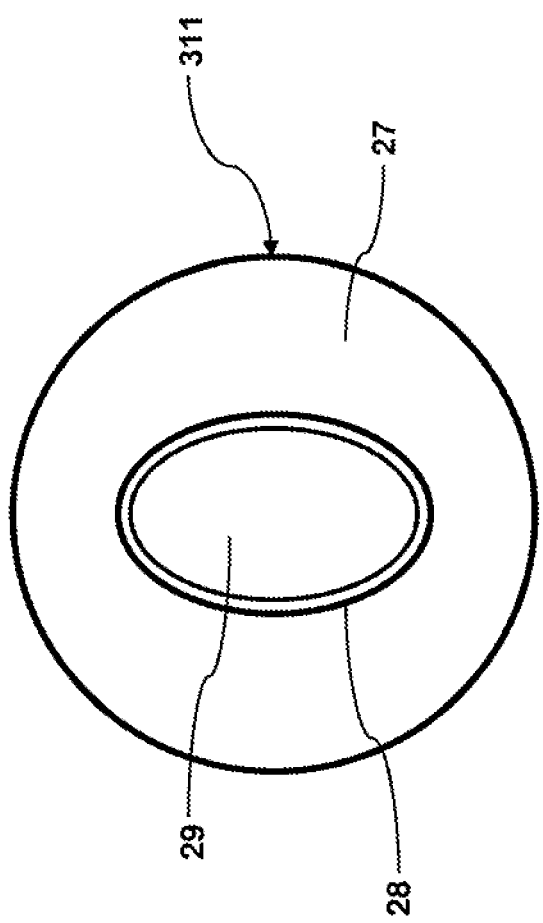
FIG. 3 shows a schematic cross-sectional representation of a shock absorber of a further exemplary embodiment of a suspension.

FIG. 3 shows a schematic cross-sectional representation of a shock absorber 311 of a further exemplary embodiment for a suspension according to the invention. A guide hole 28 is defined within the cylinder 27 and a piston rod 29 is mounted therein for axial reciprocating movement. The inner surface of the guide hole 28 is oval in cross-sectional shape and the outer surface of the piston rod 29 is correspondingly shaped. The engagement between the respective non-circularly-shaped surfaces of the piston rod 29 and the guide hole 28 therefore resist axial rotation of the piston rod relative to the cylinder 25.

Figure 4:
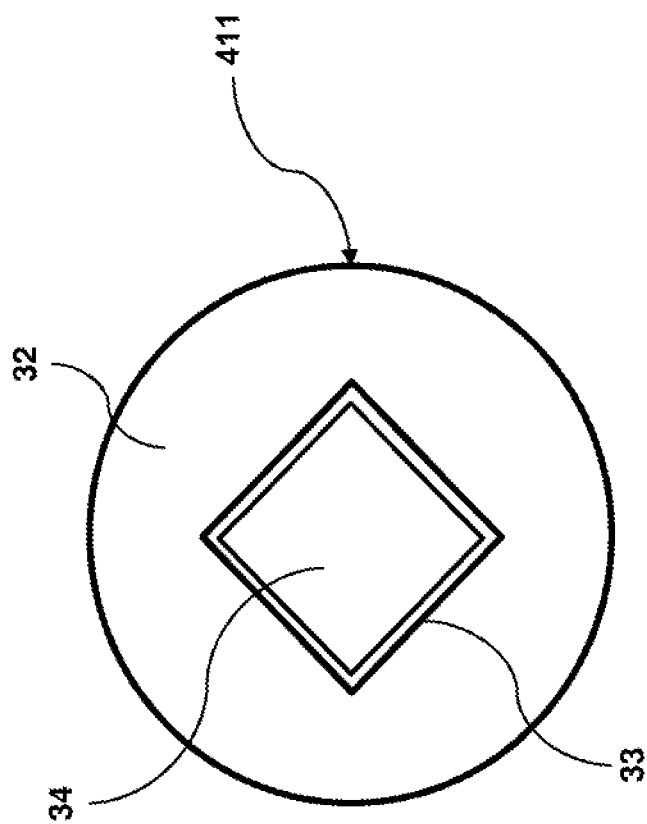
FIG. 4 shows a schematic cross-sectional representation of a shock absorber of a further exemplary embodiment of a suspension.

FIG. 4 shows a schematic cross-sectional representation of a shock absorber 411 of a further exemplary embodiment of a suspension 31 according to the invention. A guide hole 33 arranged on the cylinder 32, in which guide hole the piston rod 34 is displaceably guided, has a cross-sectional shape deviating from a circular shape, wherein the piston rod 34 has a correspondingly shaped cross-sectional area. The respective cross-sectional shapes of the guide hole 33 and of the piston rod 34 are polygonal or rectangular in design. In addition, the suspension 31 may be configured in accordance with the exemplary embodiment shown in FIG. 1.

Figure 5:
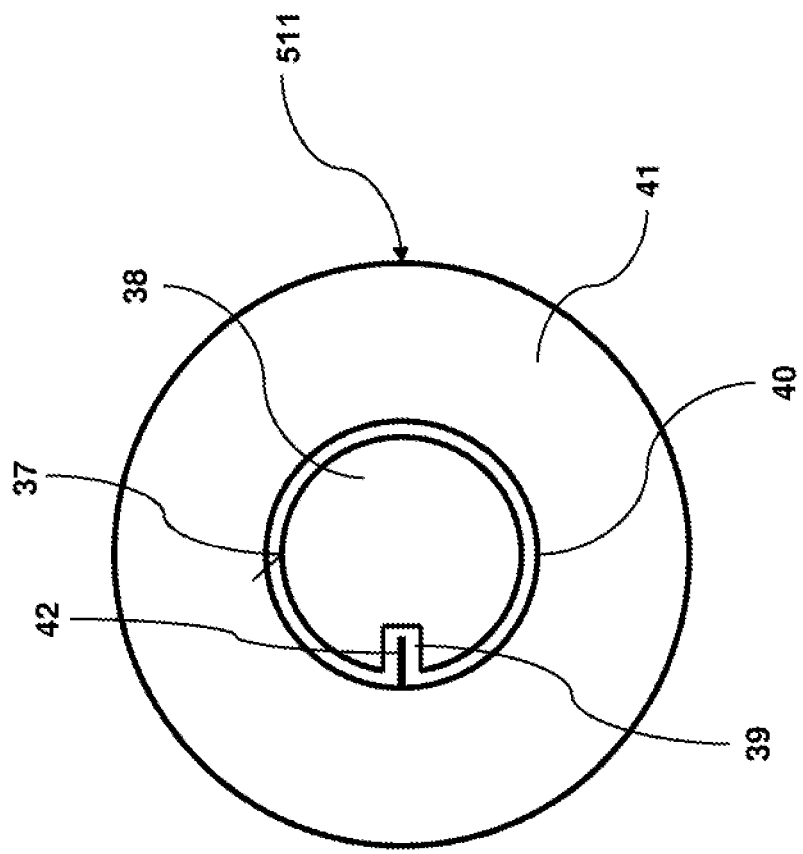
FIG. 5 shows a schematic cross-sectional representation of a shock absorber of a further exemplary embodiment of a suspension.

FIG. 5 shows a schematic cross-sectional representation of a shock absorber 511 of a further exemplary embodiment of a suspension according to the invention. An outer surface 37 of the piston rod 38 has a guide groove 39 formed therein and running axially along the piston rod 38. The guide hole 40 of the cylinder 41 has a guide element 42 which extends or projects radially inward from the inner surface thereof and engages with the guide groove 39. In FIG. 5, the clearance between the guide element 42 and the guide groove 39 is exaggerated for clarity, as will be apparent to a person of skill in the pertinent arts.

Figure 6:
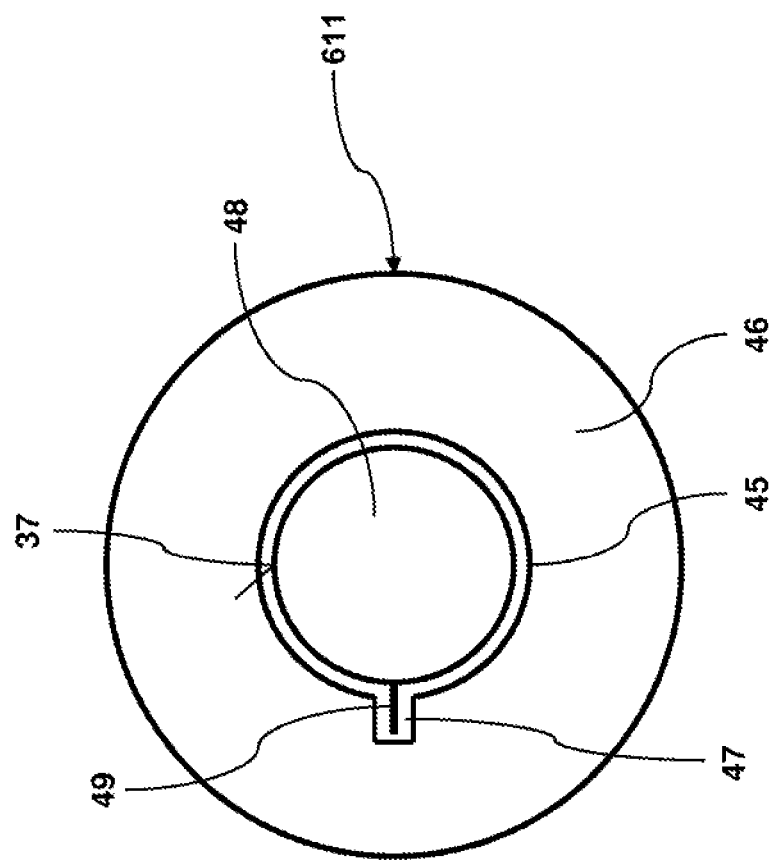
FIG. 6 shows a schematic cross-sectional representation of a shock absorber of a further exemplary embodiment of a suspension.

FIG. 6 shows a schematic cross-sectional representation of a shock absorber 611 in a further exemplary embodiment of a suspension according to the invention. A guide groove 47 running axially along the guide hole 45 is arranged on the guide hole 45 of the cylinder 46, wherein on an outside 37 of the piston rod 48 a radially outwardly pointing guide element 49 engaging with the guide groove 47 is arranged.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A suspension for a wheeled vehicle comprising:
   a hub bearing for rotatably supporting a wheel and mounted to a bearing carrier for rotation relative thereto about a steering axis;
   a shock absorber having a cylinder connected non-rotatably to the bearing carrier and having an axially-extending guide hole defined therein, and a piston and attached piston rod retained axially movably in the guide hole, the guide hole and at least one of the piston and the piston rod retained therein having respective complementary-shaped cross-sectional shapes, wherein the piston and/or the piston rod defines at least one guide groove running axially therealong, and at least one guide element projects inwardly from an inner surface of the guide hole and engages the respective at least one guide groove to resist axial rotation of the piston and/or the piston rod within the guide hole; and
   a top-mount bearing securing the piston rod non-rotatably to vehicle sprung structure.

2. A vehicle suspension comprising:
   a shock absorber having a cylinder connected non-rotatably to a hub bearing carrier, and a piston and attached piston rod axially movable inside an axial guide hole defined within the cylinder, at least one guide groove defined by and running axially along an interior surface of the guide hole, and at least one guide element projecting outwardly from the at least one of the piston and piston rod to engage the respective at least one guide groove to prevent rotation relative thereto; and
   a top-mount bearing securing the piston rod non-rotatably to vehicle sprung structure.

3. A suspension for a wheeled vehicle comprising:
   a shock absorber having a cylinder connected non-rotatably to a carrier on which a hub bearing is mounted for rotation about a steering axis, and a piston and attached piston rod retained axially movably within the cylinder, wherein the piston rod defines at least one guide groove running axially therealong, and at least one guide element projects inwardly from an inner surface of the guide hole and engages the respective at least one guide groove to prevent rotation relative thereto; and
   a top-mount bearing securing the piston rod non-rotatably to vehicle sprung structure.

\* \* \* \* \*